(No Model.)

A. CHOPARD.
STOP WATCH.

No. 470,406.    Patented Mar. 8, 1892.

Witnesses
Chas. H. Smith
J. Staib

Inventor
Albert Chopard
per Lemuel W. Serrell
Atty

UNITED STATES PATENT OFFICE.

ALBERT CHOPARD, OF MOUTIER-GRANDVAL, SWITZERLAND.

STOP-WATCH.

SPECIFICATION forming part of Letters Patent No. 470,406, dated March 8, 1892.

Application filed December 11, 1891. Serial No. 414,664. (No model.) Patented in Switzerland March 24, 1891, No. 3,308.

*To all whom it may concern:*

Be it known that I, ALBERT CHOPARD, director of the Société Industrielle, of Moutier-Grandval, Switzerland, have invented an Improved Stop-Watch, (for which I have obtained Letters Patent in Switzerland March 24, 1891, No. 3,308,) of which the following is a specification.

The invention consists of a stop-watch which is characterized by the use of a lever of peculiar shape and configuration, bearing with one of its arms alternately upon the projections or into the notches of a suitable cam-wheel, and having, furthermore, one arm, causing the wheel bearing the seconds-hand to be alternately stopped or caused to revolve and two projections causing the simultaneous setting to zero of the seconds and minute hands.

The said invention is illustrated in the accompanying drawings, in which—

Figure 1:
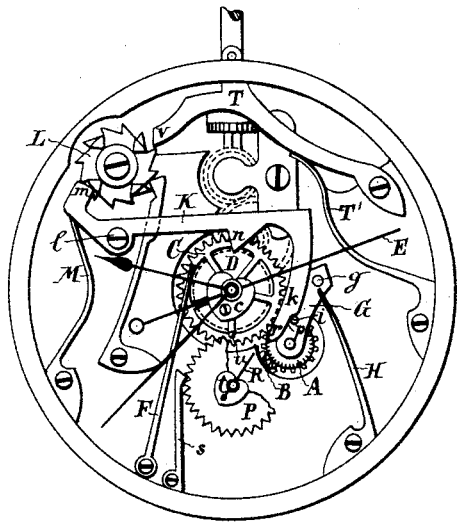
Figure 2:
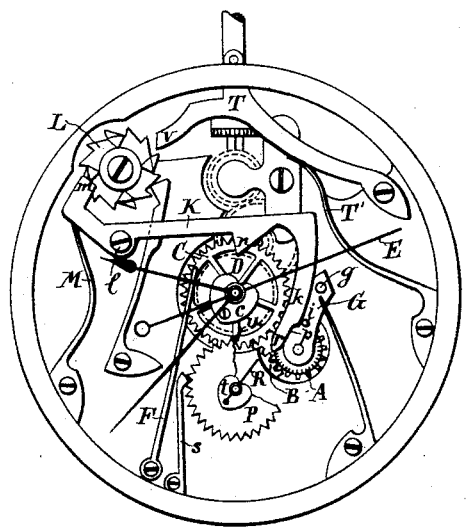

Figure 1 is a plan view of the stop-watch mechanism when going, and Fig. 2 a similar view of the same mechanism when stopped.

The position of the pieces in the moment in which the seconds and minute hands are set to zero is not shown in the drawings, being easily understood without illustration.

L is the usual ratchet and cam wheel, the ratchet-teeth of which are acted upon by means of the arm $v$ of a reciprocating push-lever T, acted upon by a spring T'. The projections of the cam-wheel L act alternately upon the arm $m$ of a lever K, which is pivoted at $l$ to the plate of the work acted upon by a spring M and provided with a tooth or projection $n$ and with an arm $k$. The latter has a recess $p$ and a projection or point $r$. The projections $n$ and $r$ of said lever K are intended to act respectively upon the heart-pieces $c$ and $t$, which bear, respectively, the seconds-hand E and the minute-hand R of the stop-watch.

The seconds-hand E and its heart-piece $c$ are both fixed to a center wheel C, free to turn on the tubular axis of the usual cannon-wheel D. A friction-spring F, fixed to the plate of the work, bears upon the wheel C and acts like a brake to maintain the latter in the position in which it has been stopped. B is the usual seconds-wheel of the watch-movement. The same engages with the lower teeth of a double cog-wheel A, having teeth in the plane of wheel B and an upper set of fine teeth placed in the plane of wheel C. The said double cog-wheel A is pivoted to a reciprocating bridge G, the fulcrum of which is at $g$, and which is acted upon by a spring H, which presses the same toward wheel C. The bridge G is provided with a pin or projection $i$, which bears upon the arm $k$ of the above-described lever K, the recess $p$ of the latter being so formed and disposed as to have the wheel A gearing with wheel C when the pin $i$ of bridge G bears upon the recessed part $p$ of the arm $k$, Fig. 1, and said wheel A being removed out of gear of wheel C when the pin $i$ of bridge G bears upon the full part of the arm $k$. (See Fig. 2.)

The minute-hand R and its heart-piece $t$ above referred to are fixed to a star-wheel P, in the teeth of which engage a pin $u$ of the center wheel C, causing the wheel P to be turned one tooth at every revolution of wheel C. A spring $s$ prevents the wheel P to be turned more than one tooth at a time.

When the parts are in the position shown in Fig. 1, the pin $i$, bearing upon the recessed part $p$ of the arm $k$, the double wheel A transmits the rotation of wheel B to the wheel C and the hand E is going. At each revolution of wheel C—that is to say, of the hand E—the pin $u$ causes the wheel P to be turned one tooth—that is to say, the hand R to be turned one minute upon its dial.

If one depresses the push-lever T, the lever K will be placed into the position shown in Fig. 2, in which the pin $i$ is pushed back by the full part of the arm $k$, and the wheel A is consequently thrown out of gear of wheel C. The wheel C being thus stopped, the hands E and R will be stopped simultaneously. Now at a new depression of lever T the projections $n$ and $r$ will fall, respectively, upon the heart-pieces $c$ and $t$, setting the hands E and R, respectively, to zero, while the pin $i$ and bridge G remain in the position shown in Fig. 2, the pin $i$ sliding along the bowed arm $k$. By a third depression of the lever T the parts will fall again into the position shown in Fig. 1.

Having thus fully described my invention, I claim—

The combination, with the minute-hand R and its cam P and the seconds-hand and its heart-cam C, of the push T and cam L, the lever K, pivoted at $l$ and having the projecting end $m$ for the push-cam L, the projection $n$ for the cam C, the end $r$ for the cam $t$, and a recess $p$, the swinging bridge G, and the gear and pin carried by the same, the latter being acted upon by the projection on the lever K adjacent to the recess $p$, substantially as specified.

In testimony whereof I have signed my name to this specification in the presence of two subscribing witnesses.

ALBERT CHOPARD.

Witnesses:
   CHARLES CRETTEZ,
*Notaire à Moutier.*
   ARISTE LACHAT,
*Receveur de District et Contrôleur à Moutier.*